(12) United States Patent
Nishimura et al.

(10) Patent No.: US 6,942,392 B2
(45) Date of Patent: Sep. 13, 2005

(54) ROLLING BEARING OF A SMALL MOTOR FOR AN INFORMATION-PROCESSING DEVICE

(75) Inventors: Nobuhiko Nishimura, Fujisawa (JP); Mamoru Aoki, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/957,462

(22) Filed: Sep. 21, 2001

(65) Prior Publication Data

US 2002/0039460 A1 Apr. 4, 2002

(30) Foreign Application Priority Data

Sep. 21, 2000 (JP) .................................... 2000-286286

(51) Int. Cl.[7] .............................................. F16C 19/06
(52) U.S. Cl. ....................................................... 384/450
(58) Field of Search ................................ 384/450, 516, 384/492, 513, 491

(56) References Cited

U.S. PATENT DOCUMENTS

| | | | | |
|---|---|---|---|---|
| 4,334,721 A | * | 6/1982 | Satoh et al. ................ | 384/450 |
| 5,501,530 A | * | 3/1996 | Nagai et al. ................ | 384/516 |
| 6,152,605 A | * | 11/2000 | Takemura et al. .......... | 384/516 |
| 6,164,833 A | * | 12/2000 | Kai et al. .................... | 384/518 |

* cited by examiner

*Primary Examiner*—Lenard A. Footland
(74) *Attorney, Agent, or Firm*—Crowell & Moring LLP

(57) ABSTRACT

A rolling bearing 1 is provided to support the rotating member of a small motor of an information-processing device wherein the groove radius ratio of the raceway groove of the inner race 2 is in the range from 52% up to 54%, while the groove radius ratio of the raceway groove of the outer race 3 is in the range from 54% up to 56%, and whereby the small motor rotates at a high rotation speed with a prolonged acoustic life.

2 Claims, 4 Drawing Sheets

ROLLING BEARING OF A SMALL MOTOR FOR AN INFORMATION-PROCESSING DEVICE

BACKGROUND OF THE INVENTION

1. Field of the Invention

This invention relates to a bearing used in a small motor for an information-processing device, and particularly to a rolling bearing of a small motor for an information-processing device, optimal as a small motor for which high-speed rotation is required, such as in the case of a HDD spindle motor.

2. Description of the Related Art

Initial acoustic performance, low torque and long-term acoustic durability performance are required for the bearing of an information-processing device, such as the bearing of a high-speed rotating HDD spindle motor.

Particularly, in recent years, the motor used for a large-capacity HDD, such as a server, is used as high speed rotation such as 15,000 rpm to 20,000 rpm, and as the speed increases, the heat produced by rotation of the bearing itself increases, so that the condition of lubrication inside the bearing becomes very inadequate for maintaining acoustical life over a long period of use.

Therefore, conventionally, the surface pressure resulting from pre-loading during use of the bearing was taken into consideration, and the maximum value for a deep-groove ball bearing given in Japan Industrial Standard JIS1519 is applied for the groove radius ratio of the raceway groove of the inner and outer-races of a conventional bearing for an information-processing device, and generally, the groove radius ratio for the raceway groove of an inner-race is set at 52%, and the groove radius ratio for the raceway groove of an outer-race is set at 53%.

Here, the "groove radius ratio" is the ratio of the groove radius of the raceway surface with respect to the ball diameter (groove radius/ball diameter).

In the case of the conventional bearing mentioned above, as the rotation member during use increases, the heat generated by the bearing causes the lubrication condition inside the bearing to become poor, resulting in that wear on the raceway surfaces of the inner and outer-races progresses, and when the bearing is used for a long period of time, there is a possibility that problems with the acoustic life could occur.

SUMMARY OF THE INVENTION

In consideration of the problems described above, it is an objective of this invention to provide a rolling bearing for the small motor of an information-processing device that is capable of maintaining at least the desired acoustic life during high-speed rotation over a long period of time.

DESCRIPTION OF PREFERRED EMBODIMENTS

In order to solve the aforementioned problems, the inventor took into consideration the acoustic life during high-speed rotation, and examined the radius of curvature of the groove radius from the aspect of the PV value, which is an indication of the degree of wear. Then, the present invention provides a rolling bearing that supports the rotating member of a small motor of an information-processing device in which the groove radius ratio of the raceway groove of the inner race is in the range from 52% up to 54%, and in which the groove radius ratio of the raceway groove of the outer race is in the range from 54% up to 56%. The ranges from 53% to 54% for the inner race and from 53% to 56% for the outer race are also desirable.

Moreover, with this invention, it is possible to provide a bearing that is capable of reducing the PV value of the raceway surfaces of the bearing, and which suppresses wear of the raceway surfaces and satisfies the requirement for long-term durability.

Figure 3:
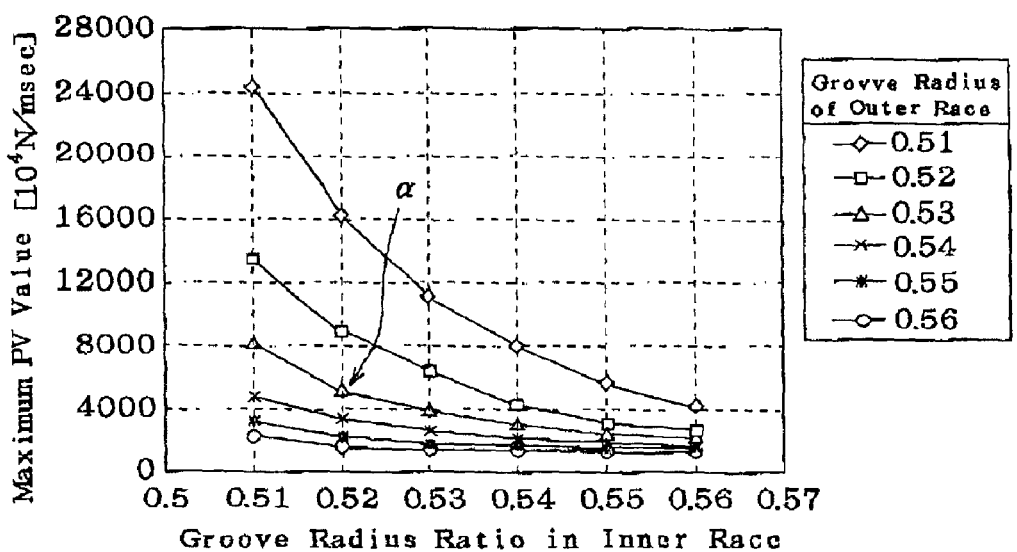
FIG. 3 is a diagram to show a relation between the groove radius ratio and the maximum PV value of the outer race.
Figure 5:
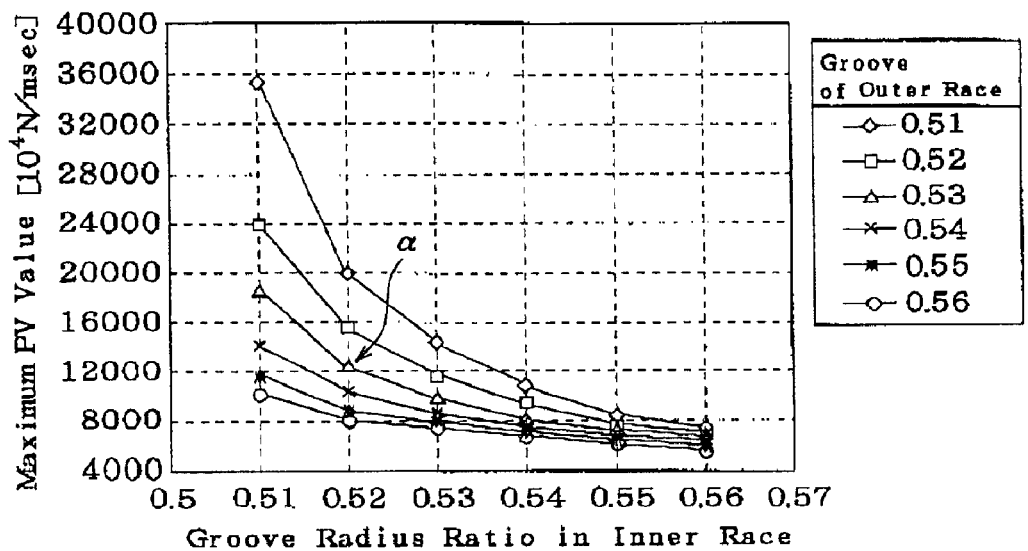
FIG. 5 is a diagram to show a relation between the groove radius ratio and the maximum PV value of the inner race.

By making the aforementioned groove radius ratios such that the groove radius ratio of the raceway groove of the inner race is 52% or greater and the groove radius ratio of the raceway groove of the outer race is 54% or greater, it is possible to keep the PV value up to $\frac{2}{3}$ on the outer race and up to $\frac{4}{5}$ on the inner race of the PV value of the conventional bearing (see FIG. 3 and FIG. 5). Therefore, as the minimum limit, the groove radius ratio for the raceway groove of the inner race is made to be 52% or greater, and the groove radius ratio for the raceway groove of the outer race is made to be 54% or greater.

Also, the surface pressure increases as the groove radius ratio becomes higher. Taking this aspect into consideration, in order to keep the maximum surface pressure 1,300 Mpa or less, the groove radius ratio for the raceway groove of the inner race is made to be 54% or less, and the groove radius ratio for the raceway groove of the outer race is made to be 56% or less (see FIG. 4 and FIG. 6).

Next, the preferred embodiments of the invention will be explained.

Figure 1:
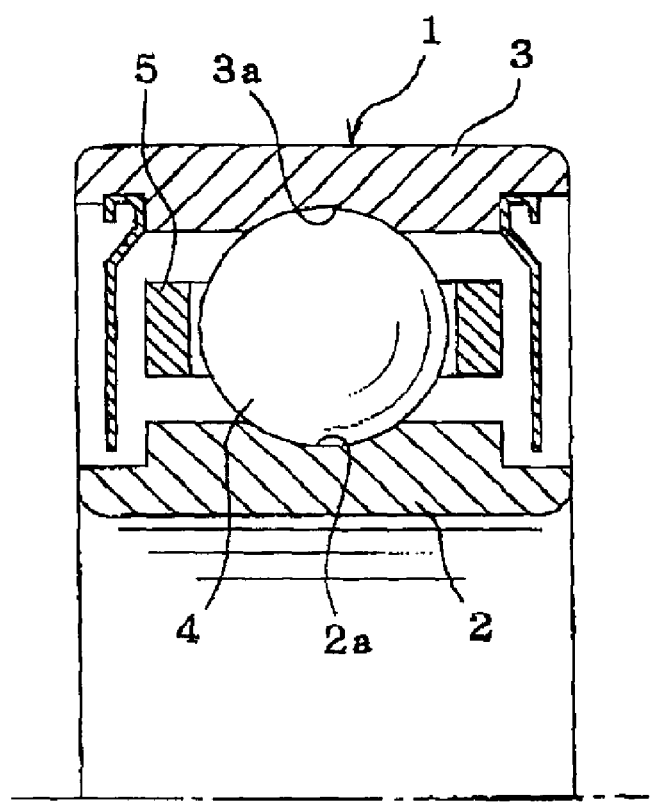
FIG. 1 is a cross sectional view to explain a bearing according to the embodiment based on the present invention.

The bearing 1 in the embodiments of the invention is a bearing for a HDD spindle motor, and as shown in FIG. 1, a plurality of balls 4 are held between the raceway surfaces 2a, 3a of the inner and outer races 2, 3 by a retainer 5.

The groove radius of the raceway groove of the raceway surface 2a of the inner race 2 is set in the range from 52 to 54% of the size of the ball diameter, for example at 53%.

Moreover, the groove radius of the raceway groove of the raceway surface 3a of the outer race 3 is set in the range from 54 to 56% of the size of the ball diameter, for example at 56%.

The internal radial gap is geometrically set in the range from 0.008 to 0.13 mm.

By using the bearing 1, constructed as described above, as the bearing for a HDD spindle motor, it is possible to provide a bearing that suppresses wear of the raceway surfaces 2a, 3a, as well as satisfies the requirements for long-term durability.

EXAMPLE 1

For a bearing 1 with an inner diameter 4 mm, outer diameter 10 mm, and width 4 mm, endurance testing under the test conditions given below, was performed, specifically for the bearing 1 of this embodiment of the invention, where the groove radius ratio of the inner race 2 was 53%, and the groove radius ratio of the outer race 3 was 56%, and for a conventional bearing for comparison, where the groove radius ratio of the inner race was 52%, and the groove radius ratio of the outer race was 53%.

Figure 2:
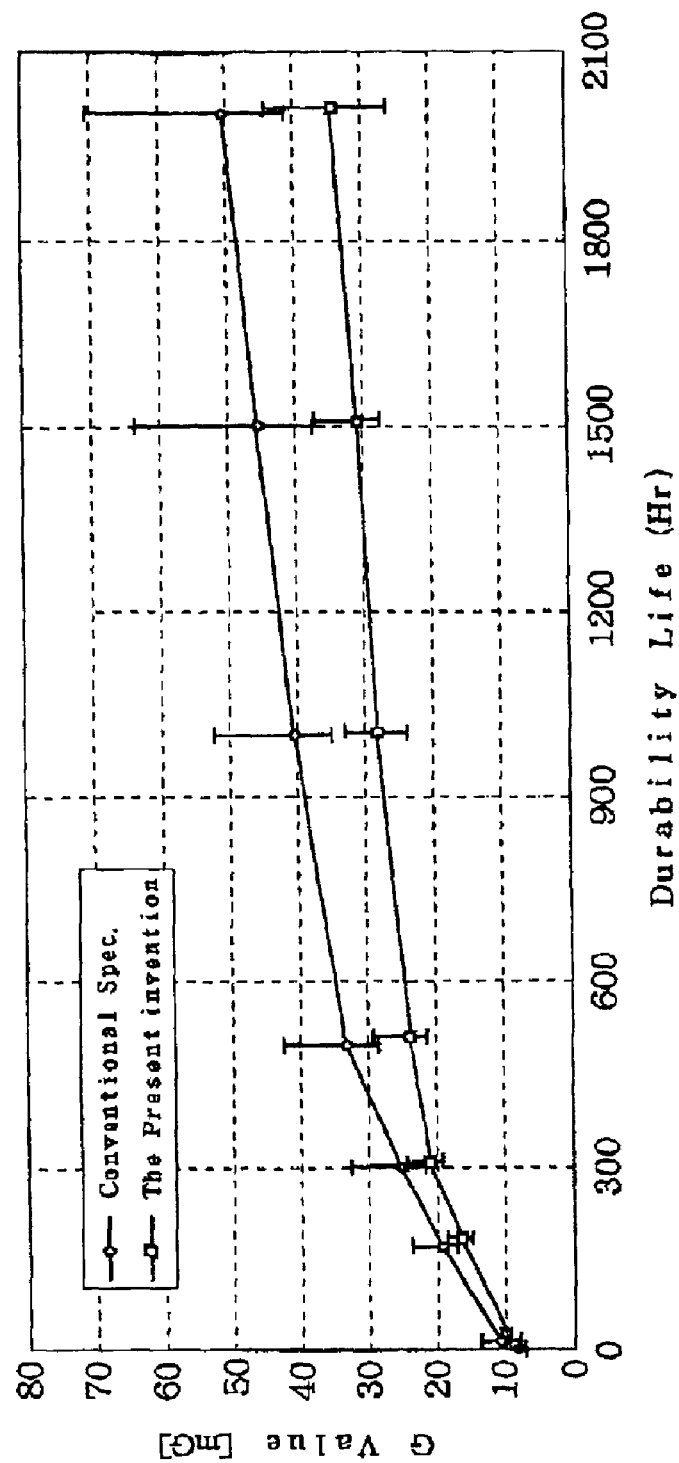
FIG. 2 is a diagram to show the sequential change (rising) in the axial vibration acceleration.

FIG. 2 shows the axial vibration acceleration (G value) of the bearing 1 in the endurance test.

Test Conditions
  Pre-load: 7.84 N
  Rotation method: Outer race 3 is rotated
  Rotation Speed: 20,000 rpm
  Temperature: 70° C.
  Period of time: to 1,000 hours Specifications of Bearing 1
  Lubrication oil: Grease (Multemp SLR, Kyodo Yushi Co., Ltd.)
  Filling amount of lubrication oil: 9 to 12% of the volume of the space inside the bearing As can be seen from FIG. 2, by adopting this invention, the axial vibration acceleration (G value) of the bearing 1 of this invention does not rise as much as a bearing of conventional specifications even when used over a long period of time. In other words, it can be seen that this invention is effective in improving the acoustic durability.

EXAMPLE 2

Next, the groove radius ratios of both raceway grooves that are formed on the raceway surfaces 2a, 3a of the inner race 2 and outer race 3 are changed among various combinations, and for each combination, simulation was performed to calculate how much the PV value could be reduced, and the PV values and maximum surface pressures were calculated for each of the raceway surfaces 2a, 3a of the inner-race and outer-race.

The calculation conditions were as follows:
  Pre-load: 7.84 N
  Rotation method: Outer race 3 is rotated
  Rotation Speed: 20,000 rpm
  Temperature: 70° C.
  Internal radial space: 0.0165 mm For the outer race 3, the maximum PV values and maximum surface pressures for each groove radius ratio are shown in FIG. 3 and FIG. 4.

Figure 6:
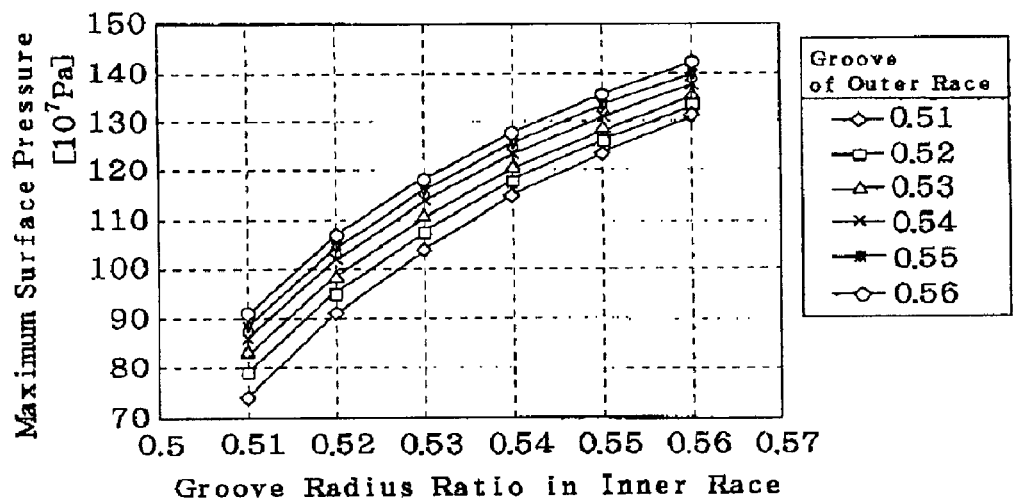
FIG. 6 is a diagram to show a relation between the groove radius ratio and the maximum surface pressure of the inner race.

Moreover, for the inner race 2, the maximum PV values and maximum surface pressures for each groove radius ratio are shown in FIG. 5 and FIG. 6.

Figure 4:
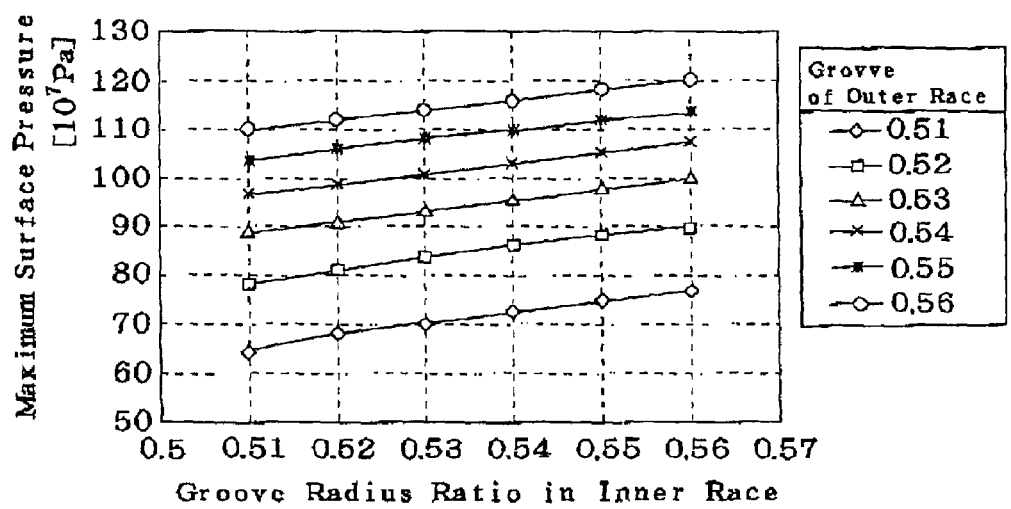
FIG. 4 is a diagram to show a relation between the groove radius ratio and the maximum surface pressure of the outer race.

As can be seen from FIG. 3 and FIG. 5, as the groove radius ratios for both the inner and outer races 2, 3 become high, the PV value decreases, however, as can be seen in FIG. 4 and FIG. 6, the larger the groove radius ratio is, the larger the maximum surface pressure becomes.

In other words, as can be seen from FIG. 3 and FIG. 5, by setting the groove radius ratio of the inner race 2 to 0.52 or greater and the groove radius ratio of the outer race 3 to 0.54 or greater, or by setting the groove radius ratio of the inner race 2 to 0.53 or greater and the groove ratio of the outer race 3 to 0.53 or greater, it is possible to keep the PV value nearly ⅔ or less with respect to the outer race, and nearly ⅘ or less with respect to the inner race, than the PV value of the bearing of the conventional specifications. In the figures, the symbol α indicates the conventional specification value.

In contrast, by simply reducing just the PV value, the higher the groove radius ratios of the inner and outer races 2, 3 are the better. However, the higher the PV value is, the larger the surface pressure becomes, and when the surface pressure is too large, there is a possibility that the bearing 1 could be scratched or that indentations could remain on the bearing 1 when assembling it in the motor, so it is preferred that the maximum surface pressure of the inner and outer races 2, 3 be 1,300 MPa or less.

Taking this point into consideration, by setting the groove radius ratio of the inner race 2 to 0.54 or less and the groove radius ratio of the outer race 3 to 0.56 or less, it is possible to keep the maximum surface pressure at 1,300 MPa or less. It is even more preferable to keep the maximum surface pressure at 1,200 MPa or less. Therefore, it is preferable that the groove radius ratio of the inner race 2 be set up to 0.53 and that the groove radius ratio of the outer race 3 be set up to 0.56.

As explained above, by adopting this invention, it is possible to improve the durability over a long period of time of the bearing used in a high-speed rotating small motor, and thus it is possible to provide a rolling bearing that can be used effectively as the bearing for a high-speed rotating information-processing device.

What is claimed is:

1. A motor for an information-processing device having a rotating member, which is supported by a rolling bearing comprising an inner race formed with a raceway groove, an outer race formed with a raceway groove, wherein the raceway groove of the inner race has a groove radius ratio in the range from 52% up to 54%, while the raceway groove of the outer race has a groove radius ratio in the range from 54% up to 56%, wherein an internal radial gap is geometrically set in the range from 0.008 to 0.13 mm, and wherein the bearing is designed to operate at a speed between 15,000 rpm and 20,000 rpm.

2. A motor for an information-processing device having a rotating member, which is supported by a rolling bearing comprising an inner race formed with a raceway groove, an outer race formed with a raceway groove, wherein the raceway groove of the inner race has a groove radius ratio in the range from 53% up to 54%, while the raceway groove of the outer race has a groove radius ratio in the range from 53% up to 56%, wherein an internal radial gap is geometrically set in the range from 0.008 to 0.13 mm, and wherein the bearing is designed to operate at a speed between 15,000 rpm and 20,000 rpm.

* * * * *